United States Patent
Huang et al.

(10) Patent No.: US 10,522,136 B2
(45) Date of Patent: Dec. 31, 2019

(54) METHOD AND DEVICE FOR TRAINING ACOUSTIC MODEL, COMPUTER DEVICE AND STORAGE MEDIUM

(71) Applicant: BAIDU ONLINE NETWORK TECHNOLOGY (BEIJING) CO., LTD., Beijing (CN)

(72) Inventors: Bin Huang, Beijing (CN); Yiping Peng, Beijing (CN); Xiangang Li, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 119 days.

(21) Appl. No.: 15/856,165

(22) Filed: Dec. 28, 2017

(65) Prior Publication Data
US 2018/0366107 A1   Dec. 20, 2018

(30) Foreign Application Priority Data
Jun. 16, 2017  (CN) .......................... 2017 1 0458720

(51) Int. Cl.
*G10L 15/06* (2013.01)
*G10L 15/16* (2006.01)

(52) U.S. Cl.
CPC ............ *G10L 15/063* (2013.01); *G10L 15/16* (2013.01)

(58) Field of Classification Search
CPC ....... G10L 15/16; G10L 15/04; G10L 15/063; G10L 15/26; G10L 15/22; G10L 2015/223; G06F 16/353; G06F 17/2785
See application file for complete search history.

(56) References Cited

U.S. PATENT DOCUMENTS

| | | | | |
|---|---|---|---|---|
| 8,209,184 | B1* | 6/2012 | Dragosh | G10L 15/30 704/270.1 |
| 8,364,486 | B2* | 1/2013 | Basir | G10L 15/02 704/251 |
| 9,324,321 | B2* | 4/2016 | Xue | G10L 15/075 |
| 9,460,711 | B1* | 10/2016 | Vanhoucke | G10L 15/16 |
| 9,589,565 | B2* | 3/2017 | Boies | G10L 15/22 |
| 9,620,145 | B2* | 4/2017 | Bacchiani | G10L 25/30 |
| 9,653,093 | B1* | 5/2017 | Matsoukas | G10L 15/08 |
| 9,786,270 | B2* | 10/2017 | Senior | G10L 15/063 |
| 9,881,613 | B2* | 1/2018 | Weinstein | H04W 4/02 |

(Continued)

FOREIGN PATENT DOCUMENTS

WO    WO-2017164954 A1 *  9/2017   .............  G10L 15/16

*Primary Examiner* — Mohammad K Islam
(74) *Attorney, Agent, or Firm* — Hodgson Russ LLP (57) ABSTRACT

Embodiments of the present disclosure provide a method and a device for training an acoustic model, a computer device and a storage medium. The method includes obtaining supervised speech data and unsupervised speech data, in which, the supervised speech data is speech data with manual annotation and the unsupervised speech data is speech data with machine annotation; extracting speech features from the supervised speech data and the unsupervised speech data; and performing a multi-task learning having a supervised learning task and an unsupervised learning task on the speech features of the supervised speech data and the unsupervised speech data by using a deep learning network, to train and obtain the acoustic model.

20 Claims, 3 Drawing Sheets

(56) References Cited

U.S. PATENT DOCUMENTS

| | | | |
|---|---|---|---|
| 9,940,933 B2* | 4/2018 | Choi | G10L 15/183 |
| 9,984,683 B2* | 5/2018 | Li | G10L 15/16 |
| 10,019,438 B2* | 7/2018 | Audhkhasi | G06F 17/28 |
| 10,074,360 B2* | 9/2018 | Kim | G10L 15/01 |
| 10,127,904 B2* | 11/2018 | Rao | G10L 15/187 |
| 10,198,435 B2* | 2/2019 | Na | G06F 17/2735 |
| 10,204,620 B2* | 2/2019 | Cui | G10L 15/16 |
| 2004/0030556 A1* | 2/2004 | Bennett | G06F 17/27 704/270 |
| 2008/0167872 A1* | 7/2008 | Okimoto | G10L 15/22 704/251 |
| 2009/0319267 A1* | 12/2009 | Kurki-Suonio | G10L 15/30 704/235 |
| 2010/0228548 A1* | 9/2010 | Liu | G10L 15/065 704/251 |
| 2013/0185072 A1* | 7/2013 | Huang | G10L 15/30 704/246 |
| 2014/0257805 A1* | 9/2014 | Huang | G10L 15/063 704/232 |
| 2015/0032442 A1* | 1/2015 | Marcus | G06F 17/271 704/9 |
| 2016/0093291 A1* | 3/2016 | Kim | G10L 15/01 381/56 |
| 2016/0093294 A1* | 3/2016 | Kapralova | G10L 15/063 704/232 |
| 2016/0155443 A1* | 6/2016 | Khan | G06F 1/3203 704/275 |
| 2016/0163310 A1* | 6/2016 | Lee | G10L 15/16 704/232 |
| 2016/0180214 A1* | 6/2016 | Kanevsky | G06N 3/0454 706/21 |
| 2017/0011738 A1* | 1/2017 | Senior | G10L 15/063 |
| 2017/0018272 A1* | 1/2017 | Lee | H04N 21/4394 |
| 2017/0032244 A1* | 2/2017 | Kurata | G10L 15/063 |
| 2017/0053652 A1* | 2/2017 | Choi | G10L 15/32 |
| 2017/0169812 A1* | 6/2017 | Lample | G06F 17/2765 |
| 2017/0169815 A1* | 6/2017 | Zhan | G10L 15/075 |
| 2017/0236510 A1* | 8/2017 | Fuchiwaki | G10L 15/22 704/251 |
| 2018/0068675 A1* | 3/2018 | Variani | G10L 25/30 |
| 2018/0122372 A1* | 5/2018 | Wanderlust | G10L 15/22 |
| 2018/0137857 A1* | 5/2018 | Zhou | G10L 15/02 |
| 2018/0174576 A1* | 6/2018 | Soltau | G10L 15/16 |
| 2018/0174589 A1* | 6/2018 | Choi | G10L 15/32 |
| 2018/0182383 A1* | 6/2018 | Kim | G06N 5/04 |
| 2018/0190268 A1* | 7/2018 | Lee | G10L 15/16 |
| 2018/0197533 A1* | 7/2018 | Lyon | G10L 15/16 |
| 2018/0247643 A1* | 8/2018 | Battenberg | G10L 15/02 |
| 2018/0254036 A1* | 9/2018 | Li | G06F 17/27 |
| 2018/0277100 A1* | 9/2018 | Cassagne | G10L 15/16 |
| 2018/0308487 A1* | 10/2018 | Goel | G10L 15/1815 |
| 2018/0314689 A1* | 11/2018 | Wang | G06F 17/2785 |
| 2018/0330714 A1* | 11/2018 | Paulik | G10L 15/32 |
| 2018/0366105 A1* | 12/2018 | Kim | G10L 15/22 |
| 2019/0206389 A1* | 7/2019 | Kwon | G10L 15/063 |

* cited by examiner

METHOD AND DEVICE FOR TRAINING ACOUSTIC MODEL, COMPUTER DEVICE AND STORAGE MEDIUM

CROSS-REFERENCE TO RELATED APPLICATIONS

This application is based on and claims priority to Chinese Patent Application No. 201710458720.6, filed on Jun. 16, 2017, the entire contents of which are incorporated herein by reference.

FIELD

Embodiments of the present disclosure relate to speech recognition technologies, and more particularly to a method and a device for training an acoustic model, a computer device and a storage medium.

BACKGROUND

Speech technology has changed the way we live and work in recent years. Speech recognition employs speeches as research objects and allows a machine to automatically recognize and understand human oral language through speech signal processing and pattern recognition. The speech recognition is a convenient way of human-computer interaction, and now widely used in mobile internet and other fields, such as signal processing, pattern recognition, probability theory and information theory, sounding and auditory mechanism, artificial intelligence and the like. The speech recognition technology is a technology that allows the machine to translate speech signals into corresponding text or commands through recognition and understanding.

In the speech recognition technology, an accuracy of an acoustic model determines a correctness and effectiveness of the speech recognition. It requires a large amount of high quality speech data with annotation to train the acoustic model for the speech recognition. The more the data is, the higher accuracy of the trained acoustic model is. However, it is very time-consuming to annotate the speech data manually, and it is not feasible to obtain a large amount of training data through manual annotation, and it is expensive and difficult to purchase a large amount of speech data with annotation from a third party.

SUMMARY

Embodiments of the present disclosure provide a method for training an acoustic model. The method includes obtaining supervised speech data and unsupervised speech data, in which, the supervised speech data is speech data with manual annotation and the unsupervised speech data is speech data with machine annotation; extracting speech features from the supervised speech data and the unsupervised speech data; and performing a multi-task learning having a supervised learning task and an unsupervised learning task on the speech features of the supervised speech data and the unsupervised speech data by using a deep learning network, to train and obtain the acoustic model.

Embodiments of the present disclosure provide a computer device. The computer device includes one or more processors and a storage device. The storage medium is configured to store one or more programs. When the one or more programs are executed by the one or more processors, the one or more processors implement the method for training an acoustic model described above.

Embodiments of the present disclosure provide a computer readable storage medium, configured to store computer instructions. When the instructions are executed by a processor, the method for training an acoustic model described above is implemented.

DETAILED DESCRIPTION

Reference will be made in detail to the present disclosure with reference to the accompanying drawings and the embodiments. It should be understood that, the embodiments described herein are only used to explain the present disclosure, and rather than to limit the present disclosure. In addition, it should also be noted that, for convenience of description, only some but not all structures related to the present disclosure are illustrated in the accompanying drawings.

Embodiment One

Figure 1:
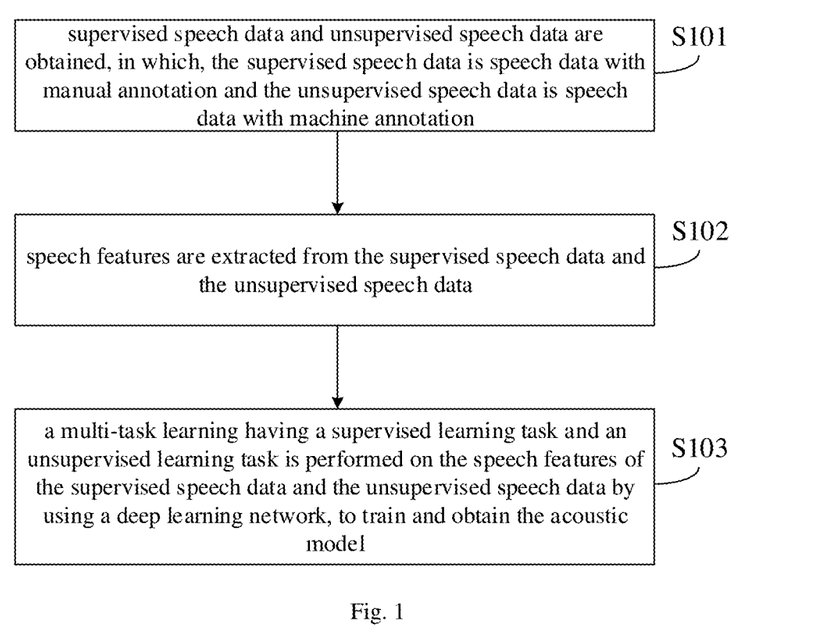
FIG. 1 is a flow chart of a method for training an acoustic model according to embodiment one of the present disclosure.

FIG. 1 is a flow chart of a method for training an acoustic model according to embodiment one of the present disclosure. The embodiment may be applied to a case of obtaining an acoustic model by training. The method may be performed by a device for training an acoustic model. The device may be achieved by software and/or hardware. As illustrated in FIG. 1, the method includes follows.

At block S101, supervised speech data and unsupervised speech data are obtained. The supervised speech data is speech data with manual annotation and the unsupervised speech data is speech data with machine annotation.

In detail, the supervised speech data may be speech data annotated manually in advance, or pre-purchased speech data with manual annotation, or both of these two. The unsupervised speech data may be obtained from Internet online products, such as from anonymous user traffic for example Baidu search or Baidu input method. The unsupervised speech data has not been annotated manually, and only has machine annotation, i.e., only has results of automatic recognition of online speech service as annotations.

At block S102, speech features are extracted from the supervised speech data and the unsupervised speech data.

In detail, it is necessary to extract the speech features of the supervised speech data and the unsupervised speech data to convert the speech features into a form that facilitates to train the acoustic model, such as Mel-frequency cepstrum coefficients (MFCC), Mel-scale filter bank (FBANK), etc. In embodiments of the present disclosure, the form of the speech feature is not limited, and the acoustic model may be trained by using different speech features.

At block S103, a multi-task learning having a supervised learning task and an unsupervised learning task is performed on the speech features of the supervised speech data and the unsupervised speech data by using a deep learning network, to train and obtain the acoustic model.

In the related art, in order to obtain an accurate acoustic model, a great number of speech data with manual annotation is required for training, such that there is a problem of time consuming and high cost. However, in embodiments of the present disclosure, the acoustic model is trained and obtained by using both the supervised speech data and the unsupervised speech data as training data to perform the multi-task learning having the supervised learning task and the unsupervised learning task, thereby avoiding all using a large amount of expensive speech data with manual annotation, and reducing costs.

Here, it should be noted that, a conventional single-task learning only has one learning task, and the supervised data is usually used to train, i.e., the speech data with manual annotation is used to train the acoustic model, so that content of speech can be accurately predicted. In embodiments of the present disclosure, both the supervised speech data and the unsupervised speech data are used as the training data. Since quality of the unsupervised speech data therein is lower than that of the supervised speech data, when they are not distinguished and are directly mixed to train the acoustic model, performance of the model may usually be decreased. Therefore, in embodiments of the present disclosure, the multi-task learning is adopt to allow a deep learning neural network to learn two tasks (i.e. the supervised learning task and the unsupervised learning task) at the same time, the supervised speech data and the unsupervised speech data are used to train, and parameters of the neural network are adjusted, thereby avoiding the above problems of the single-task learning.

In detail, the deep learning network in embodiments of the present disclosure may be any neural network, such as a deep convolutional neural network or a deep recurrent neural network, etc., which is not limited in embodiments of the present disclosure.

As a preferred embodiment, the deep learning network includes an input layer, at least one hidden layer and an output layer. The input layer is shared by the supervised learning task and the unsupervised learning task. The at least one hidden layer is shared by the supervised learning task and the unsupervised learning task and trained commonly by the supervised speech data and the unsupervised speech data. The output layer includes a supervised learning task output layer and an unsupervised learning task output layer.

In addition, as another preferred embodiment, the deep learning network includes an input layer, at least one hidden layer and an output layer. The input layer is shared by the supervised learning task and the unsupervised learning task. A first part of the at least one hidden layer is shared by the supervised learning task and the unsupervised learning task, and a second part of the at least one hidden layer is separately trained and adjusted by the supervised learning task and the unsupervised learning task. The output layer includes a supervised learning task output layer and an unsupervised learning task output layer.

For each of the above two embodiments, the multi-task learning can be implemented. The difference of the above two embodiments lies that whether the at least one hidden layer is shared by the two learning tasks. In an implementation, the number of the at least one hidden layer can be set and selected according to needs. For example, when the number of the at least one hidden layer is three, it can be that all the three hidden layers are shared by the supervised learning task and the unsupervised learning task, and it can also be that the last layer of the three hidden layers is separately trained and adjusted by the supervised learning task and the unsupervised learning task, and the first two layers of the three hidden layers are shared by the supervised learning task and the unsupervised learning task.

After the model is trained, i.e., parameters of the model are determined, the model can be used to recognize new speech data in a reasoning phase. For this, in at least one embodiment, a final acoustic model may be determined by the following two ways.

Way one: after the model is trained, a final acoustic model is that of obtained by discarding parameters of the at least one hidden layer and/or parameters of the output layer trained and adjusted by the unsupervised learning task, to only retain outputs of the supervised learning task of the acoustic model in a reasoning phase.

Way two: after the model is trained, a final acoustic model is that of obtained by retaining all the parameters of the model, to retain both outputs of the supervised learning task and outputs of the unsupervised learning task in the reasoning phase, and merge the outputs as a final output. The outputs may be merged by methods of calculating average values or calculating weighted average values, which are not limited in embodiments of the present disclosure.

For the above way one, when the at least one hidden layer is shared by the supervised learning task and the unsupervised learning task and trained commonly by the supervised speech data and the unsupervised speech data in training, the parameters of the output layer corresponding to the unsupervised learning task are discarded. For the above way two, when the first part of the at least one hidden layer is shared by the supervised learning task and the unsupervised learning task, and the second part of the at least one hidden layer is separately trained and adjusted by the supervised learning task and the unsupervised learning task, the parameters of the at least one hidden layer and parameters of the output layer trained and adjusted by the unsupervised learning task are discarded. The obtained acoustic model after discarding is used to recognize the speech in the reasoning phase.

In embodiments of the present disclosure, the acoustic model is trained and obtained by using the speech features of the supervised speech data and the unsupervised speech data as training data and by using the multi-task learning, in which the supervised speech data is the speech data with manual annotation and the unsupervised speech data is the speech data with machine annotation, thereby saving costs of annotating the speech data manually for training the acoustic model, eliminating the need to purchase expensive speech data with manual annotation, and continuously improving performance of the speech recognition.

Embodiment Two

Figure 2:
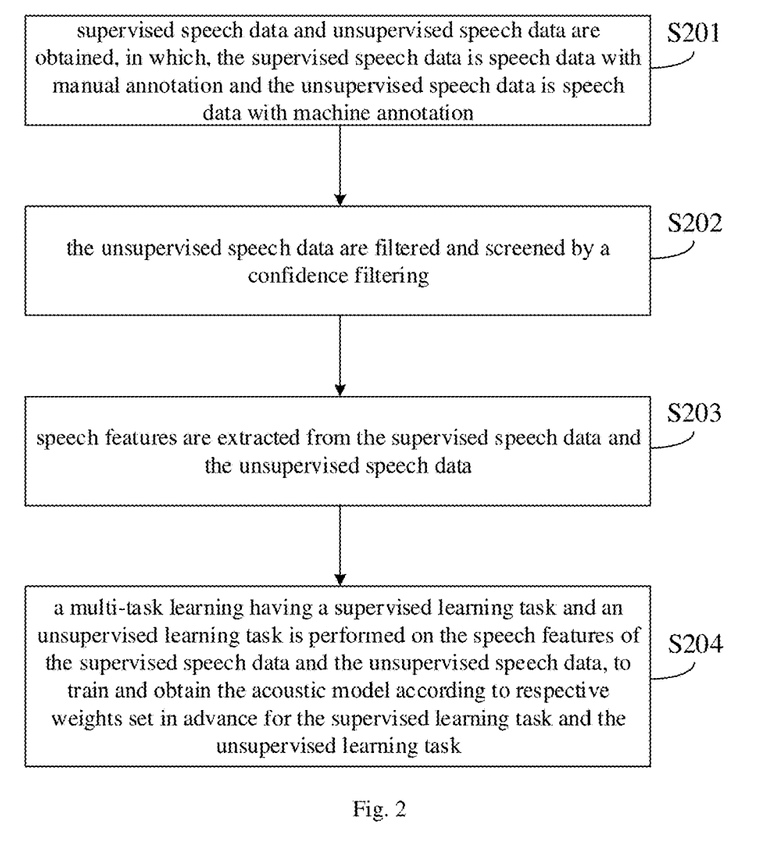
FIG. 2 is a flow chart of a method for training an acoustic model according to embodiment two of the present disclosure.

FIG. 2 is a flow chart of a method for training an acoustic model according to embodiment two of the present disclosure. The embodiment two is further optimized on the basis of the embodiment one. As illustrated in FIG. 2, the method may include follows.

At block S201, supervised speech data and unsupervised speech data are obtained. The supervised speech data is speech data with manual annotation and the unsupervised speech data is speech data with machine annotation.

At block S202, the unsupervised speech data are filtered and screened by a confidence filtering.

The unsupervised speech data obtained directly from Internet online products usually includes data with poor quality, such as incomplete speech data, unclear speech data with noise, or commonly used speech data with a low value.

The confidence filtering may include persona, text feature or acoustic likelihood, etc. By the confidence filtering, speech data with high quality can be filtered and screened out, so that a more accurate acoustic model is trained.

At block S203, speech features are extracted from the supervised speech data and the unsupervised speech data.

At block S204, a multi-task learning having a supervised learning task and an unsupervised learning task is performed on the speech features of the supervised speech data and the unsupervised speech data, to train and obtain the acoustic model according to respective weights set in advance for the supervised learning task and the unsupervised learning task.

In embodiments of the present disclosure, before training, the weights of the supervised learning task and the unsupervised learning task can be set in advance according to needs, to perform the multi-task learning having the supervised learning task and the unsupervised learning task according to the weights, so that training result is more conform to actual use, and can be flexibly adjusted according to the quality of the training data.

In embodiments of the present disclosure, the unsupervised speech data with higher quality can be filtered and screened out by the confidence filtering, so that the more accurate acoustic model is trained, at the same time, the multi-task learning is better performed by setting the weights, thereby improving flexibility and accuracy of the application.

Embodiment Three

Figure 3:
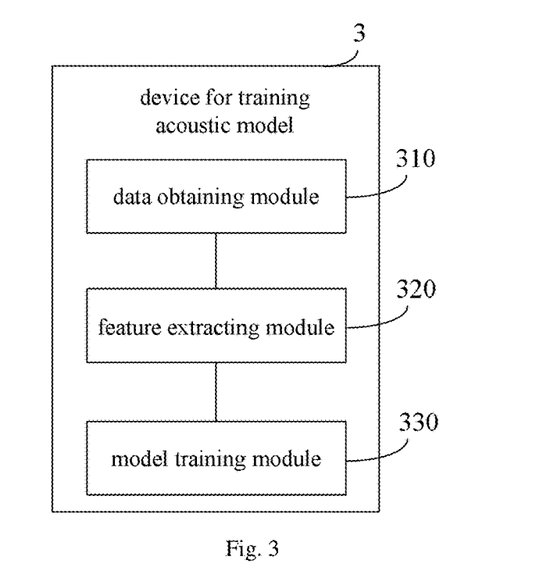
FIG. 3 is a block diagram of a device for training an acoustic model according to embodiment three of the present disclosure.

FIG. 3 is a block diagram of a device for training an acoustic model according to embodiment three of the present disclosure. As illustrated in FIG. 3, the device 3 for training an acoustic model includes a data obtaining module 310, a feature extracting module 320 and a model training module 330.

The data obtaining module 310 is configured to obtain supervised speech data and unsupervised speech data. The supervised speech data is speech data with manual annotation and the unsupervised speech data is speech data with machine annotation.

The feature extracting module 320 is configured to extract speech features from the supervised speech data and the unsupervised speech data.

The model training module 330 is configured to perform a multi-task learning having a supervised learning task and an unsupervised learning task on the speech features of the supervised speech data and the unsupervised speech data by using a deep learning network, to train and obtain the acoustic model.

In at least one embodiment, the deep learning network includes an input layer, at least one hidden layer and an output layer. The input layer is shared by the supervised learning task and the unsupervised learning task. The at least one hidden layer is shared by the supervised learning task and the unsupervised learning task and trained commonly by the supervised speech data and the unsupervised speech data. The output layer includes a supervised learning task output layer and an unsupervised learning task output layer.

In at least one embodiment, the deep learning network includes an input layer, at least one hidden layer and an output layer. The input layer is shared by the supervised learning task and the unsupervised learning task. A first part of the at least one hidden layer is shared by the supervised learning task and the unsupervised learning task, and a second part of the at least one hidden layer is separately trained and adjusted by the supervised learning task and the unsupervised learning task. The output layer includes a supervised learning task output layer and an unsupervised learning task output layer.

After the model is trained, i.e., parameters of the model are determined, the model can be used to recognize new speech data in a reasoning phase. For this, in at least one embodiment, a final acoustic model may be determined by the following two ways.

Way one: after the model is trained, a final acoustic model is that of obtained by discarding parameters of the at least one hidden layer and/or parameters of the output layer trained and adjusted by the unsupervised learning task, to only retain outputs of the supervised learning task of the acoustic model in a reasoning phase.

Way two: after the model is trained, a final acoustic model is that of obtained by retaining all the parameters of the model, to retain both outputs of the supervised learning task and outputs of the unsupervised learning task in the reasoning phase, and merge the outputs as a final output. The outputs may be merged by methods of calculating average values or calculating weighted average values, which are not limited in embodiments of the present disclosure.

In addition, the model training module 330 is configured to perform the multi-task learning having the supervised learning task and the unsupervised learning task on the speech features of the supervised speech data and the unsupervised speech data, to train and obtain the acoustic model according to respective weights set in advance for the supervised learning task and the unsupervised learning task.

In addition, the device 3 further includes a filtering module (not illustrated in FIG. 3).

The filter module is configured to filter and screen the unsupervised speech data by a confidence filtering after the data obtaining module 310 obtains the supervised speech data and the unsupervised speech data and before the feature extracting module 320 extracts the speech features.

The device for training an acoustic model provided by embodiments of the present disclosure may be configured to perform the method for training an acoustic model provided by any embodiments, includes corresponding modules configured to perform the method and has beneficial effects.

Embodiment Four

Figure 4:
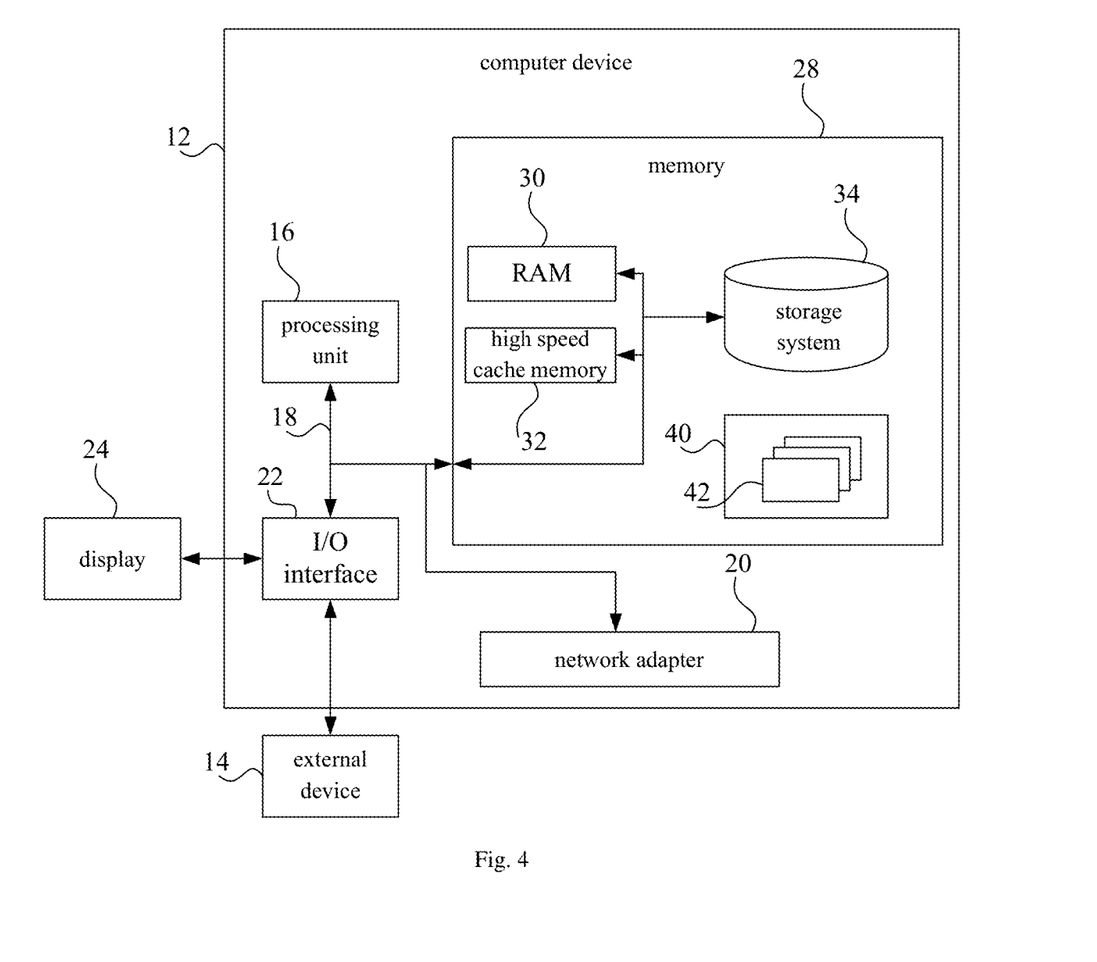
FIG. 4 is a schematic diagram of a computer device according to embodiment four of the present disclosure.

FIG. 4 is a block diagram illustrating a computer device according to an embodiment of the present disclosure. FIG. 4 illustrates a block diagram of an exemplary computer device 12 suitable for realizing implementations of the present disclosure. The computer device 12 illustrated in FIG. 4 is merely an example, which should be not understood to limit the functions and usage scope of embodiments of the present disclosure.

As illustrated in FIG. 4, the computer device 12 may be represented via a general computer device form. Components of the computer device 12 may include but be not limited to one or more processors or processing units 16, a system memory 28, and a bus 18 connecting various system components including the system memory 28 and the processing units 16.

The bus 18 represents one or more of several types of bus structures, including a memory bus or a memory controller, a peripheral bus, a graphics acceleration port, a processor, or a local bus using any of a variety of bus structures. For example, these architectures include, but are not limited to, an Industry Standard Architecture (hereinafter referred to as ISA) bus, a Micro Channel Architecture (hereinafter referred to as MAC) bus, an enhanced ISA bus, a Video Electronics Standards Association (hereinafter referred to as VESA) local bus and Peripheral Component Interconnection (PCI) bus.

The computer device 12 typically includes a variety of computer system readable media. These media may be any available media accessible by the computer device 12 and includes both volatile and non-volatile media, removable and non-removable media.

The system memory 28 may include a computer system readable medium in the form of volatile memory, such as a random access memory (hereinafter referred to as RAM) 30 and/or a high speed cache memory 32. The computer device 12 may further include other removable or non-removable, volatile or non-volatile computer system storage media. By way of example only, the storage system 34 may be configured to read and write a non-removable and non-volatile magnetic media (not shown in FIG. 4, commonly referred to as a "hard drive"). Although not shown in FIG. 4, a magnetic disk driver for reading from and writing to a removable and non-volatile magnetic disk (such as "floppy disk") and a disk driver for a removable and non-volatile optical disk (such as compact disk read only memory (hereinafter referred to as CD-ROM), Digital Video Disc Read Only Memory (hereinafter referred to as DVD-ROM) or other optical media) may be provided. In these cases, each driver may be connected to the bus 18 via one or more data medium interfaces. The memory 28 may include at least one program product. The program product has a set (such as, at least one) of program modules configured to perform the functions of various embodiments of the present disclosure.

A program/utility 40 having a set (at least one) of the program modules 42 may be stored in, for example, the memory 28. The program modules 42 include but are not limited to, an operating system, one or more application programs, other programs modules, and program data. Each of these examples, or some combination thereof, may include an implementation of a network environment. The program modules 42 generally perform the functions and/or methods in the embodiments described herein.

The computer device 12 may also communicate with one or more external devices 14 (such as, a keyboard, a pointing device, a display 24, etc.). Furthermore, the computer device 12 may also communicate with one or more communication devices enabling a user to interact with the computer device 12 and/or other devices (such as a network card, modem, etc.) enabling the computer device 12 to communicate with one or more computer devices. This communication can be performed via the input/output (I/O) interface 22. Also, the computer device 12 may communicate with one or more networks (such as a local area network (hereafter referred to as LAN), a wide area network (hereafter referred to as WAN) and/or a public network such as an Internet) through a network adapter 20. As shown in FIG. 4, the network adapter 20 communicates with other modules of the computer device 12 over the bus 18. It should be understood that, although not shown in FIG. 4, other hardware and/or software modules may be used in connection with the computer device 12. The hardware and/or software includes, but is not limited to, microcode, device drivers, redundant processing units, external disk drive arrays, RAID systems, tap Drive and data backup storage system.

The processing unit 16 is configured to execute various functional applications and data processing by running programs stored in the system memory 28, for example, implementing the method for training an acoustic model provided in embodiments of the present disclosure.

Embodiment Five

The embodiment five of the present disclosure provides a computer readable storage medium, configured to store computer instructions. When the instructions are executed by a processor, a method for training an acoustic model described above is implemented.

The storage medium provided by embodiments of the present disclosure may adopt any combination of one or more computer readable media. The computer readable medium may be a computer readable signal medium or a computer readable storage medium. The computer readable storage medium may be, but is not limited to, for example, an electrical, magnetic, optical, electromagnetic, infrared, or semiconductor system, apparatus, device, component or any combination thereof. A specific example of the computer readable storage media include (a non-exhaustive list): an electrical connection having one or more wires, a portable computer disk, a hard disk, a random access memory (RAM), a read only memory (ROM), an Erasable Programmable Read Only Memory (EPROM) or a flash memory, an optical fiber, a compact disc read-only memory (CD-ROM), an optical memory component, a magnetic memory component, or any suitable combination thereof. In context, the computer readable storage medium may be any tangible medium including or storing programs. The programs may be used by an instruction executed system, apparatus or device, or a connection thereof.

The computer readable signal medium may include a data signal propagating in baseband or as part of a carrier which carries computer readable program codes. Such propagated data signal may be in many forms, including but not limited to an electromagnetic signal, an optical signal, or any suitable combination thereof. The computer readable signal medium may also be any computer readable medium other than the computer readable storage medium, which may send, propagate, or transport programs used by an instruction executed system, apparatus or device, or a connection thereof.

The program code stored on the computer readable medium may be transmitted using any appropriate medium, including but not limited to wireless, wireline, optical fiber cable, RF, or any suitable combination thereof.

The computer program code for carrying out operations of embodiments of the present disclosure may be written in one or more programming languages. The programming language includes an object oriented programming language, such as Java, Smalltalk, C++, as well as conventional procedural programming language, such as "C" language or similar programming language. The program code may be executed entirely on a user's computer, partly on the user's computer, as a separate software package, partly on the user's computer, partly on a remote computer, or entirely on the remote computer or server. In a case of the remote computer, the remote computer may be connected to the user's computer or an external computer (such as using an Internet service provider to connect over the Internet) through any kind of network, including a Local Area Network (hereafter referred as to LAN) or a Wide Area Network (hereafter referred as to WAN).

It should be noted that, the above are only preferred embodiments and applied technical principles of the present disclosure. Those skilled in the art should understand that, the present disclosure is not limited to the specific embodiments described herein, and various obvious changes, readjustments and substitutions that are made by those skilled in the art will not depart from the scope of the present disclosure. Therefore, although the present disclosure has been described in detail by the above embodiments, the present disclosure is not limited to the above embodiments, and more other equivalent embodiments may be included without departing from the concept of the present disclosure, and the scope of the present disclosure is determined by the scope of the appended claims.

What is claimed is:

1. A method for training an acoustic model, comprising:
obtaining supervised speech data and unsupervised speech data, wherein the supervised speech data is speech data with manual annotation and the unsupervised speech data is speech data with machine annotation;
extracting speech features from the supervised speech data, and extracting speech features from the unsupervised speech data; and
performing a supervised learning task on the speech features of the supervised speech data, and performing an unsupervised learning task on the speech features of the unsupervised speech data, by using a deep learning network, to train and obtain the acoustic model;
wherein the deep learning network comprises an input layer, at least one hidden layer and an output layer;
wherein the input layer is shared by the supervised learning task and the unsupervised learning task, such that the supervised learning task and the unsupervised learning task are performed in parallel; and
after training the model, a final acoustic model is that of obtained by retaining all the parameters of the model, to retain both outputs of the supervised learning task and outputs of the unsupervised learning task in the reasoning phase, and merging the outputs as a final output.

2. The method according to claim 1, wherein,
the at least one hidden layer is shared by the supervised learning task and the unsupervised learning task and trained commonly by the supervised speech data and the unsupervised speech data; and
the output layer comprises a supervised learning task output layer and an unsupervised learning task output layer.

3. The method according to claim 1, wherein,
a first part of the at least one hidden layer is shared by the supervised learning task and the unsupervised learning task, and a second part of the at least one hidden layer is separately trained and adjusted by the supervised learning task and the unsupervised learning task; and
the output layer comprises a supervised learning task output layer and an unsupervised learning task output layer.

4. The method according to claim 2, wherein,
after training the model, a final acoustic model is that of obtained by discarding parameters of the at least one hidden layer and/or parameters of the output layer trained and adjusted by the unsupervised learning task, to only retain outputs of the supervised learning task of the acoustic model in a reasoning phase.

5. The method according to claim 3, wherein,
after training the model, a final acoustic model is that of obtained by discarding parameters of the at least one hidden layer and/or parameters of the output layer trained and adjusted by the unsupervised learning task, to only retain outputs of the supervised learning task of the acoustic model in a reasoning phase.

6. The method according to claim 1, wherein performing the supervised learning task on the speech features of the supervised speech data, and performing the unsupervised learning task on the speech features of the unsupervised speech data, using the deep learning network, to train and obtain the acoustic model comprises:
performing the supervised learning task on the speech features of the supervised speech data, and performing the unsupervised learning task on the speech features of the unsupervised speech data, to train and obtain the acoustic model according to respective weights set in advance for the supervised learning task and the unsupervised learning task.

7. The method according to claim 1, after obtaining the supervised speech data and the unsupervised speech data, and before extracting the speech features, further comprising:
filtering and screening the unsupervised speech data by a confidence filtering.

8. A computer device, comprising:
one or more processors;
a storage device, configured to store one or more programs;
wherein the one or more processors are configured to read the one or more programs from the storage device to perform acts of:
obtaining supervised speech data and unsupervised speech data, wherein the supervised speech data is speech data with manual annotation and the unsupervised speech data is speech data with machine annotation;
extracting speech features from the supervised speech data, and extracting speech features from the unsupervised speech data; and
performing a supervised learning task on the speech features of the supervised speech data, and performing an unsupervised learning task on the speech features of the unsupervised speech data by using a deep learning network, to train and obtain the acoustic model;
wherein the deep learning network comprises an input layer, at least one hidden layer and an output layer;
wherein the input layer is shared by the supervised learning task and the unsupervised learning task, such that the supervised learning task and the unsupervised learning task are performed in parallel; and
after training the model, a final acoustic model is that of obtained by retaining all the parameters of the model, to retain both outputs of the supervised learning task and outputs of the unsupervised learning task in the reasoning phase, and merging the outputs as a final output.

9. The computer device according to claim 8, wherein,
the at least one hidden layer is shared by the supervised learning task and the unsupervised learning task and trained commonly by the supervised speech data and the unsupervised speech data; and
the output layer comprises a supervised learning task output layer and an unsupervised learning task output layer.

10. The computer device according to claim 8, wherein,
a first part of the at least one hidden layer is shared by the supervised learning task and the unsupervised learning task, and a second part of the at least one hidden layer is separately trained and adjusted by the supervised learning task and the unsupervised learning task; and the output layer comprises a supervised learning task output layer and an unsupervised learning task output layer.

11. The computer device according to claim 9, wherein, after training the model, a final acoustic model is that of obtained by discarding parameters of the at least one hidden layer and/or parameters of the output layer trained and adjusted by the unsupervised learning task, to only retain outputs of the supervised learning task of the acoustic model in a reasoning phase.

12. The computer device according to claim 10, wherein, after training the model, a final acoustic model is that of obtained by discarding parameters of the at least one hidden layer and/or parameters of the output layer trained and adjusted by the unsupervised learning task, to only retain outputs of the supervised learning task of the acoustic model in a reasoning phase.

13. The computer device according to claim 8, wherein the one or more processors are configured to perform the supervised learning task on the speech features of the supervised speech data, and performing the unsupervised learning task on the speech features of the unsupervised speech data, using the deep learning network, to train and obtain the acoustic model by acts of:

performing the supervised learning task on the speech features of the supervised speech data, and performing the unsupervised learning task on the speech features of the unsupervised speech data, to train and obtain the acoustic model according to respective weights set in advance for the supervised learning task and the unsupervised learning task.

14. The computer device according to claim 8, wherein the one or more processors are further configured to read the one or more programs from the storage device to perform acts of:

after obtaining the supervised speech data and the unsupervised speech data and before extracting the speech features, filtering and screening the unsupervised speech data by a confidence filtering.

15. A non-transitory computer readable storage medium, configured to store computer instructions, wherein when the instructions are executed by a processor, a method for training an acoustic model is implemented and the method comprises:

obtaining supervised speech data and unsupervised speech data, wherein the supervised speech data is speech data with manual annotation and the unsupervised speech data is speech data with machine annotation;

extracting speech features from the supervised speech data and extracting speech features from the unsupervised speech data; and performing a supervised learning task on the speech features of the supervised speech data, and performing an unsupervised learning task on the speech features of the unsupervised speech data by using a deep learning network, to train and obtain the acoustic model;

wherein the deep learning network comprises an input layer, at least one hidden layer and an output layer;

wherein the input layer is shared by the supervised learning task and the unsupervised learning task, such that the supervised learning task and the unsupervised learning task are performed in parallel; and after training the model, a final acoustic model is that of obtained by retaining all the parameters of the model, to retain both outputs of the supervised learning task and outputs of the unsupervised learning task in the reasoning phase, and merging the outputs as a final output.

16. The non-transitory computer readable storage medium according to claim 15, wherein, the at least one hidden layer is shared by the supervised learning task and the unsupervised learning task and trained commonly by the supervised speech data and the unsupervised speech data; and the output layer comprises a supervised learning task output layer and an unsupervised learning task output layer.

17. The non-transitory computer readable storage medium according to claim 15, wherein, a first part of the at least one hidden layer is shared by the supervised learning task and the unsupervised learning task, and a second part of the at least one hidden layer is separately trained and adjusted by the supervised learning task and the unsupervised learning task; and the output layer comprises a supervised learning task output layer and an unsupervised learning task output layer.

18. The non-transitory computer readable storage medium according to claim 16, wherein, after training the model, a final acoustic model is that of obtained by discarding parameters of the at least one hidden layer and/or parameters of the output layer trained and adjusted by the unsupervised learning task, to only retain outputs of the supervised learning task of the acoustic model in a reasoning phase.

19. The non-transitory computer readable storage medium according to claim 15, wherein performing the supervised learning task on the speech features of the supervised speech data, and performing the unsupervised learning task on the speech features of the unsupervised speech data using the deep learning network, to train and obtain the acoustic model comprises:

performing the supervised learning task on the speech features of the supervised speech data, and performing the unsupervised learning task on the speech features of the unsupervised speech data, to train and obtain the acoustic model according to respective weights set in advance for the supervised learning task and the unsupervised learning task.

20. The non-transitory computer readable storage medium according to claim 15, wherein the method further comprises:

after obtaining the supervised speech data and the unsupervised speech data and before extracting the speech features, filtering and screening the unsupervised speech data by a confidence filtering.

* * * * *